United States Patent [19]
Shinoda et al.

[11] Patent Number: 4,618,482
[45] Date of Patent: Oct. 21, 1986

[54] METHOD FOR CONTROLLING A CONCENTRATION OF SLURRY IN WET FLUE GAS DESULFURIZATION APPARATUS

[75] Inventors: Naoharu Shinoda; Atsushi Tatani; Setsuo Omoto; Susumu Okino, all of Hiroshima City; Taku Shimizu, Tokyo, all of Japan

[73] Assignee: Mitsubishi Jukogyo Kabushiki Kaisha, Tokyo, Japan

[21] Appl. No.: 643,456

[22] Filed: Aug. 23, 1984

[51] Int. Cl.[4] .................. C01B 17/00; C01F 1/00; C01F 5/40; C01F 11/46
[52] U.S. Cl. .................. 423/242; 423/166
[58] Field of Search ............ 423/242 A, 166, 242 R

[56] References Cited

U.S. PATENT DOCUMENTS 2,090,142  8/1937  Nonhebel et al. .................. 423/242
2,090,143  8/1937  Nonhebel et al. .................. 423/242
3,808,321  4/1974  Fukui et al. .................. 423/166

Primary Examiner—Gregory A. Heller
Attorney, Agent, or Firm—Birch, Stewart, Kolasch & Birch

[57] ABSTRACT

A method for controlling the concentration of a slurry in an absorption tower in which a flue gas comprising $SO_2$ is brought into contact with a slurry containing suspended Ca compounds therein to absorb the $SO_2$ with the compounds. The method comprises withdrawing the slurry from the absorption tower in such a way that the slurry is divided into at least two groups with different concentrations, one group being a slurry having a higher concentration of the Ca compound, the other group being a slurry having a lower concentration of the Ca compound, and regulating rates of the slurries being withdrawn from the absorption tower whereby the concentration of the Ca compound in the slurry being contacted with the flue gas is controlled.

5 Claims, 2 Drawing Figures

FIG. I

METHOD FOR CONTROLLING A CONCENTRATION OF SLURRY IN WET FLUE GAS DESULFURIZATION APPARATUS

BACKGROUND OF THE INVENTION

1. Field of the Invention

The present invention relates to the art of flue gas desulfurization and more particularly, to a method for controlling the concentration of a slurry in a wet flue gas desulfurization apparatus in which $SO_2$ in the exhaust gas is absorbed in a slurry of suspended solid matters and the solid sulfur compounds are recovered as byproducts.

2. Description of the Prior Art

At present, the mainstream of flue gas desulfurization systems is a flue gas desulfurization apparatus using a so-called wet lime process in which the flue gas is desulfurized using $CaCO_3$ or $Ca(OH)_2$ as a absorbent in order to recover sulfur in the form of calcium sulfite or calcium sulfate (gypsum). For instance, this process is described in detail in Japanese Laid-open Patent Application 57-63117 and other numerous publications.

Reference is now made to FIG. 1 illustrating a currently, industrially, widely adopted flue gas desulfurization apparatus using wet lime processes.

Flue gas 1 comprising $SO_2$ is passed into a body of an absorption tower 2. At the lower portion of the absorption tower 2 is provided a tank 3 containing a slurry in which a Ca compound is suspended. The slurry is agitated by means of an agitator 4 to prevent the solid matters from settling. The slurry suspending the Ca compound is fed to the top of the tower 2 by means of a circulation pump 5, by which it is sprayed throughout the tower and flows down through the tower while contacting the flue gas, before being returned to the tank 3. The flue gas from which $SO_2$ has been removed by contact with the slurry is discharged through a mist eliminator 6 as a purified gas 7. On the other hand, to the tank 3 is fed a slurry of $CaCO_3$ or $Ca(OH)_2$ through line 8 in an amount which depends on the amount of $SO_2$ being absorbed. The slurry which contains calcium sulfite produced by the absorption of $SO_2$ with the absorbent is fed from line 9 to an oxidizing column 10. Air 12 is blown from a bubble generator 11 provided at the bottom of the oxidizing column and sulfuric acid is fed from line 13, whereby calcium sulfite as well as unreacted $CaCO_3$ or $Ca(OH)_2$ is oxidized into gypsum. The gypsum slurry from the oxidizing column 10 is passed through line 14 into a thickener 15 and the resulting concentrated gypsum slurry is fed through line 16, a tank 17 and a pump 18 into a centrifugal separator 19 to obtain gypsum 20. The filtrate is fed to a tank 21 and then through a pump 22 and line 23 into the thickener 15. The supernatant liquid in the thickener 15 is passed from line 24 to a tank 25 and may be used in adjustment of, for example, the absorbent in the flue gas desulfurization apparatus or may be discharged from a pump 26.

In view of these circumstances, the present inventors made intensive studies to simplify the existing flue gas desulfurization apparatus for economy. As a result, it was found that by analysis of experimental data of the velocity of reaction between crystals of $CaCO_3$ or $Ca(OH)_2$ and $SO_2$, the oxidation reaction velocity of calcium sulfite produced by absorption of $SO_2$, the rate of settle of gypsum, the underlying concept of the known 'one operation in one step' process in which the respective reactions were carried out in individual steps could be overcome. More particularly, operations including absorption and oxidation of $SO_2$, settlement and concentration of gypsum and recovery of supernatant liquid could be collectively carried out in an absorption tower having a tank in a simple and collective manner by proper control of concentrations of slurries in the desulfurization system.

Accordingly, an object of the invention is to provide a method for controlling a concentration of a Ca compound in slurry in a wet flue gas desulfurization apparatus.

The above and other objects, features and advantages of the present invention will become apparent from the following detailed description with reference to the accompanying drawings.

BRIEF DESCRIPTION OF THE DRAWINGS

Reference is now made to FIG. 2 illustrating the wet flue gas desulfurization apparatus used in the method of the invention. Flue gas 101 comprising $SO_2$ is introduced into an absorption tower 102. In FIG. 2, the flue gas and an absorption slurry are shown to contact each other by parallel current flow, but the countercurrrent flow gas-liquid contact system as shown in FIG. 1 may be also used. In the practice of the invention, the parallel current flow is preferably used because of the advantage that the efficiency of the oxidization reaction into gypsum is improved as described hereinafter.

Figure 1:
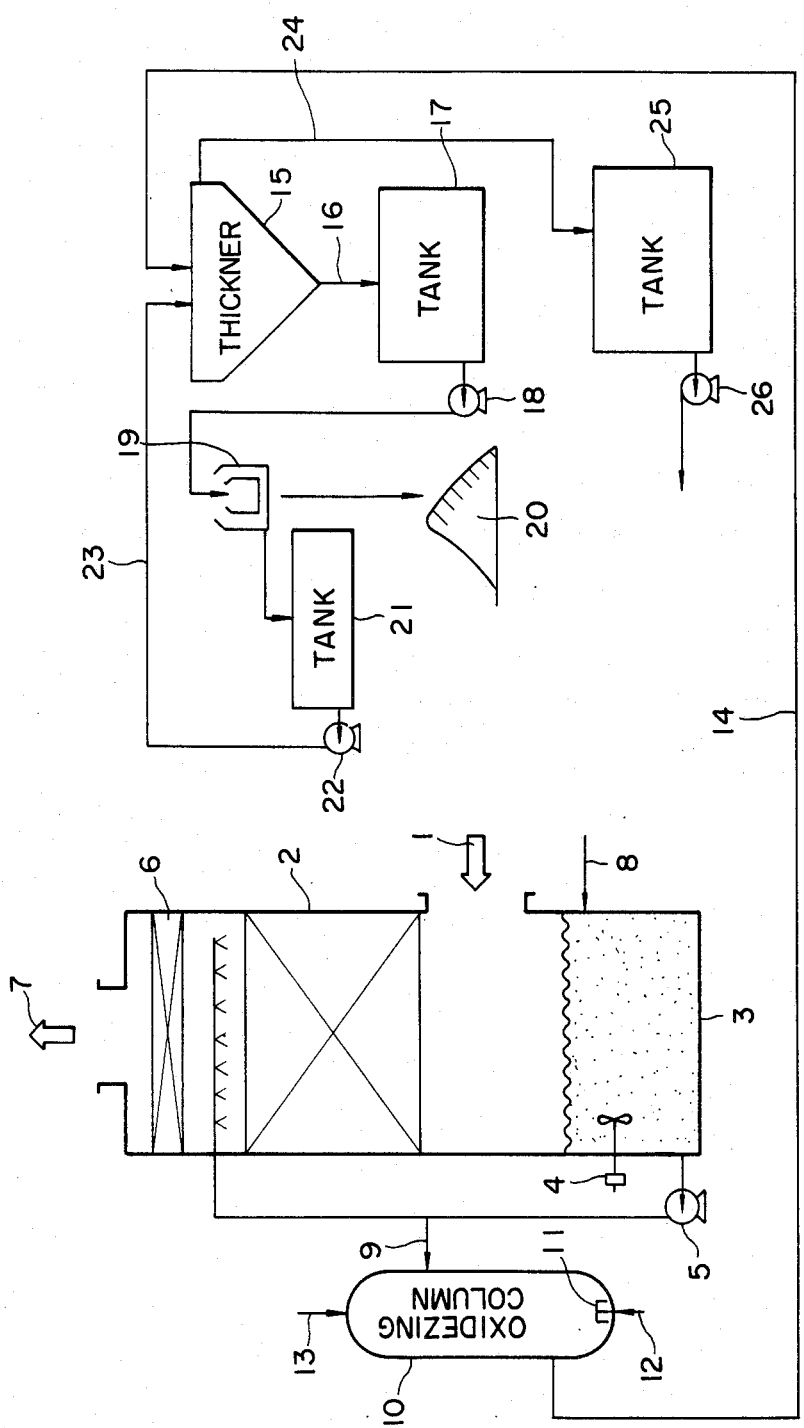
FIG. 1 is a flue gas desulfurization apparatus using a wet lime process which has been hitherto adopted industrially.

At the lower portion of the absorption tower 102 is provided a tank receiving a slurry in which a Ca compound is suspended. The slurry is agitated by means of an agitator 104 so that solid matters are prevented from settling. The slurry suspending the Ca compound is passed to the top of the tower by means of a circulation pump 105 and is sprayed throughout the tower, and flows down through the tower while contacting with the flue gas and returning to the tank 103. The flue gas from which $SO_2$ has been removed by contact with the slurry, is discharged through a mist eliminator 106 as a purified gas 107.

On the other hand, to the tank 103 is fed, through a powder transport line 108, powder of $CaCO_3$ or $Ca(OH)_2$ in an amount corresponding to the absorption of $SO_2$. $CaCO_3$ or $Ca(OH)_2$ serving as the absorbent may be fed to the tank 103 in the form of a slurry in water. Calcium sulfite which is produced by the absorption of $SO_2$ in the absorbent is oxidized with oxygen contained in the flue gas into gypsum crystals because the slurry in the gas-liquid zone of the parallel flow system is kept acidic.

However, in the case where the content of oxygen in the flue gas is low, a gas containing oxygen gas is fed from an air nozzle 109, by which the absorbed $SO_2$ can be converted to gypsum.

In the manner as described above, because the slurry of the Ca compound in which gypsum crystals are suspended is maintained in the tank 103, the slurry containing gypsum crystals is passed through a slurry discharge port 110 and a pump 119 to a separator 111 in which a gypsum cake 112 is obtained. The resulting filtrate is returned from line 113 to the tank 103.

In the tank 103 is provided a partition wall 114 extending from the liquid level to a lower portion of the slurry to establish a liquid chamber 115 which is separated from the agitated slurry. The partition wall 114 has an open lower end, which permits the slurry agitated by the agitator 104 to be passed to the liquid chamber 115 partitioned by the partition wall 114 through the open lower portion. As will be seen from FIG. 2, a baffle plate 116 is provided so that the supernatant liquid in the liquid chamber 115 is not disturbed by the movement of the agitated slurry. The supernatant liquid in the liquid chamber 115 is discharged through a supernatant discharge port 117 and a pump 118. The filtrate from line 113 is passed from the upper to the lower portion, at the lower portion of the liquid chamber 115 in order to prevent gypsum crystals from rising in the liquid chamber. The slurry discharge port 110 is so located that gypsum crystals are settled and condensed by means of an inclined plate which is provided at the end of the tank 103 positioned at the lower portion of the liquid chamber 115.

In this manner, the concentration of gypsum crystals in the slurry which is withdrawn by means of a pump 119 becomes high, thus leading to saving of energy required for transportation of liquid.

In the wet flue gas desulfurization apparatus, it is usual to use a large quantity of water, for example, by passing wash water from a washing nozzle 121 in order to prevent the crystals of the Ca compound in the mist collected in the mist eliminator 106 from being deposited and accumulated to render a gas flow path narrow, or by flowing sealing water for the pumps in the apparatus. Such water will disturb the concentration of the slurry contained in the tank 103. Variation in concentration of the slurry will will unstable the operation and control of the wet flue gas desulfurization apparatus and invite scaling troubles accompanied by a variation in concentration of seed crystals. These problems have not been hitherto solved. In the wet flue gas desulfurization apparatus using a slurry of, especially, Ca compounds, the prevention of scaling is one of important problems. According to our studies, the main cause of the scaling problems was found to be due to variation in the concentration of the slurry which is attributable to the introduction of water into the system.

In the practice of the invention, the variation in concentration of the slurry is suitably prevented. More particularly, according to the invention, the concentration of the Ca compound in the slurry in the wet flue gas desulfurization apparatus can be stably controlled by carrying out, simultaneously and arbitrarily without a delay of response, two operations including an operation of discharging the slurry suspending crystals of the Ca compound from the tank of the wet flue gas desulfurization apparatus and an operation of discharging the supernatant liquid having a low concentration of the crystals of the Ca compound. The present invention is characterized in that the above good effects of the invention can be obtained while simplifying the arrangement of the invention compared to the known wet desulfurization systems.

The present invention is described in more detail by way of example.

EXAMPLE

Figure 2:
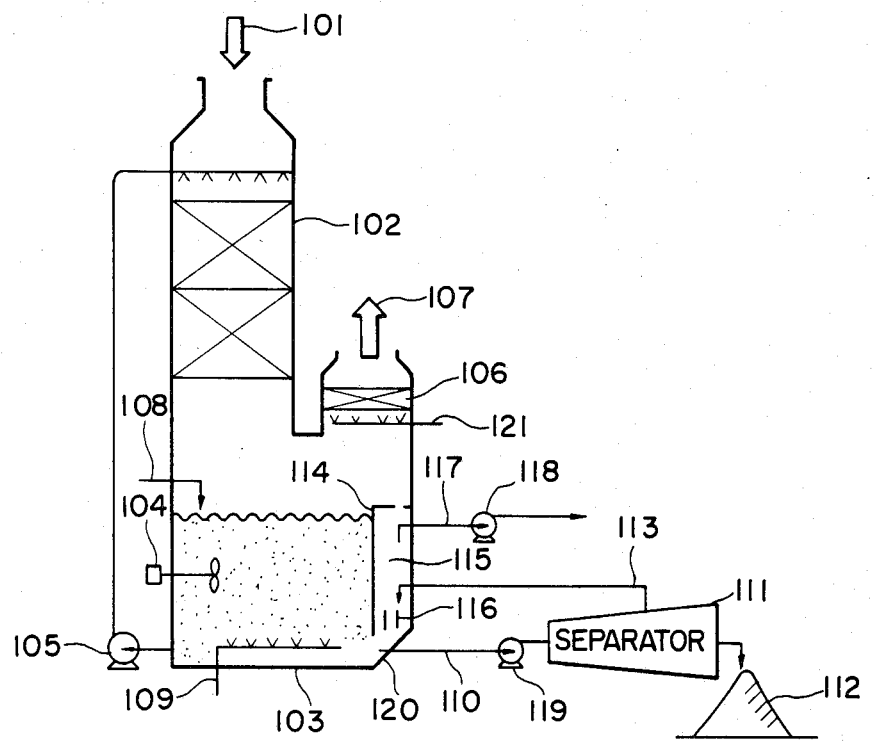
FIG. 2 is a schematic view of a wet flue gas desulfurization apparatus used to carry out the method of the invention.

The apparatus shown in FIG. 2 was used.

The tank 103 containing a slurry comprising gypsum crystals had a section of 1000 mm×2000 mm with a liquid depth of 2000 mm. By the use of the circulation pump 105, 50 m$^3$/hour of the slurry was sprayed from the top of the absorption tower 102. In the tower were filled grids, and 3,000 Nm$^3$/hour of a flue gas was treated by a gas-liquid parallel current procedure and desulfurized until 1200 ppm of $SO_2$ at the inlet was reduced to 60 ppm of $SO_2$ at the outlet.

To the tank 103 was fed $CaCO_3$ powder as absorbent from the line 108 in an amount corresponding to an amount of the absorbed $SO_2$. In the inside of the tank 103 was provided a circular partition plate 114 having an inner diameter of 400 mm and a height of 2500 mm and opened at the lower end thereof. The supernatant liquid was withdrawn from the liquid chamber 115 established by the partition wall 114. The supernatant liquid from the line 117 contained a slight amount of solid matters. However, by control of the flow rate of the supernatant liquid and the flow rate of the slurry at the discharge port 110 with a microcomputer, the concentration of the Ca compound in the slurry contained in the tank 103 could be controlled within a desired concentration ranging from 1 to 35 wt %.

In this test, the solid matters discharged from the separator 111 had a composition of 97 wt % of $CaSO_4.2H_2O$, 0.5 wt % of $CaCO_3$ and 2.5 wt % of others and was thus made substantially of gypsum, with to calcium sulfite being detected. During the operation, no air was fed from the air nozzle 109 provided in the tank 103. When the gas-liquid contact of the parallel current system was effected in the grids-filled tower, $SO_2$ which was absorbed in the top of the absorption tower in the case of flue gas desulfurization by the wet lime process was all oxidized with oxygen in the exhaust gas upon passing downward through the grids-filled portion. Accordingly, no oxidation with air in the tank 103 was necessary.

During the operation of the test, although water was charged from the washing nozzle 121 and water for sealing the pumps was used, the concentration in the slurry could be controlled within a desired range according to the method of the invention.

According to the present invention, the oxidizing column, thickener, tank for filtrate, tank for supernatant liquid and pumps, valves and measuring instruments required for these devices as will be necessary in known wet flue gas desulfurization apparatus are not necessary, giving evidence that the operation procedure can be remarkably simplified.

What is claimed is:

1. A method of controlling the concentration of slurry in an absorption tower where exhaust gas containing $SO_2$ is brought into contact with a slurry having a suspension of a Ca compound therein so as to absorb $SO_2$, said method comprising a slurry tank disposed at the lower part of said absorbing tower, a liquid chamber provided to communicate with said slurry tank and the slurry contained therein whereby the slurry is separated into at least a first and a second slurry having different concentrations of the Ca compound to form a first slurry layer having a higher concentration of the Ca compound relative to the concentration of Ca compound in said slurry tank and a second slurry layer of lower concentration of the Ca compound relative to the concentration of the Ca compound in said slurry tank, withdrawing a portion of the slurry from each of said two slurry layers and controlling the amount of slurry flow withdrawn and providing means for stirring the slurry in said slurry tank whereby the concentration of Ca compound in the slurry coming into contact with exhaust gas is controlled.

2. The method of controlling the concentration of slurry in an absorbing tower, as claimed in claim 1, wherein the liquid chamber is formed by partition walls disposed in the slurry tank.

3. The method of controlling the concentration of slurry in an absorbing tower, as claimed in claim 1, wherein the formation of slurry layers of different concentrations of the Ca compound is carried out by withdrawing a portion of the slurry from the bottom of the liquid chamber and, after removing gypsum from the withdrawn slurry, the filtrate is returned to the upper part of said liquid chamber.

4. The method of controlling the concentration of slurry in an absorbant tower, as claimed in claim 1, wherein the slurry layer of higher concentration comprises about 1-35 weight percent of the Ca compound and the slurry layer of lower concentration further comprises a slight amount of solid matters.

5. The method of controlling the concentration of slurry in an absorbing tower, as claimed in claim 1, wherein the exhaust gas enters the absorbing tower from the top of said tower.

* * * * *